Nov. 26, 1935.     C. M. WOOLLEY     2,022,333
HEATING CABINET
Filed July 7, 1934     2 Sheets-Sheet 1
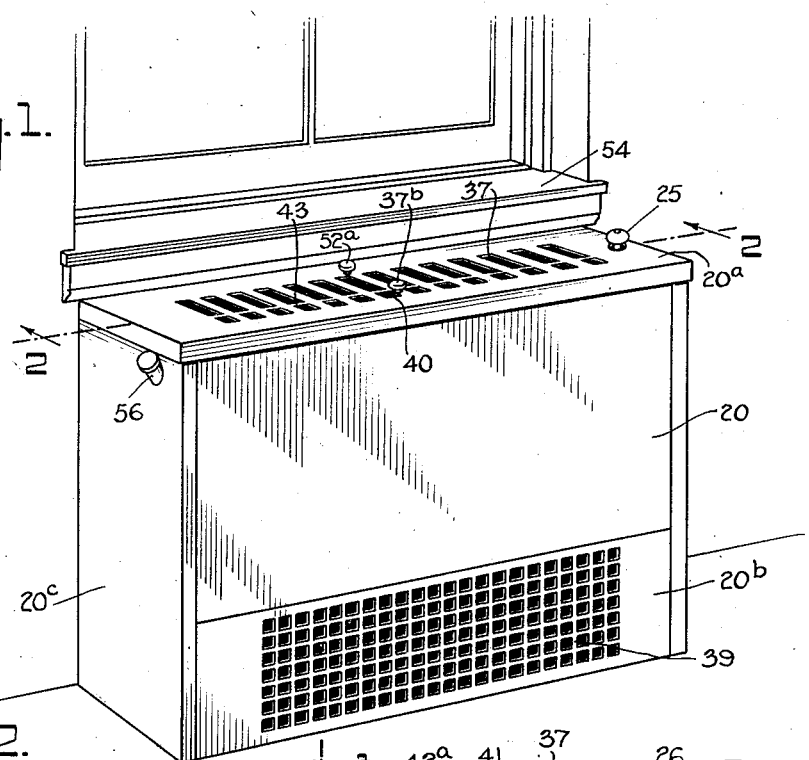
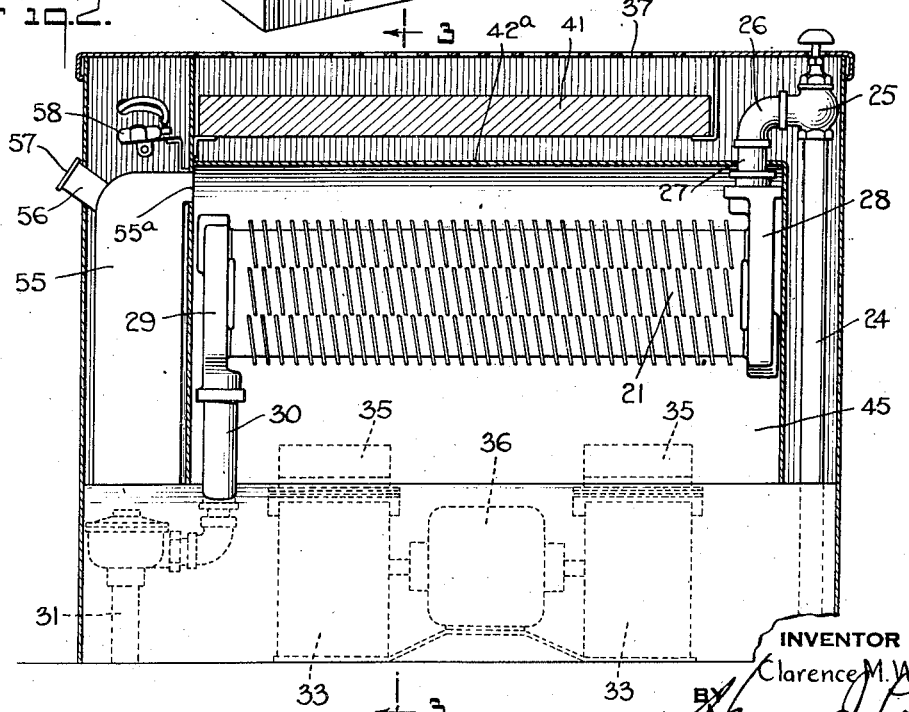
INVENTOR
Clarence M. Woolley
BY
HIS ATTORNEY Nov. 26, 1935.  C. M. WOOLLEY  2,022,333
HEATING CABINET
Filed July 7, 1934  2 Sheets-Sheet 2
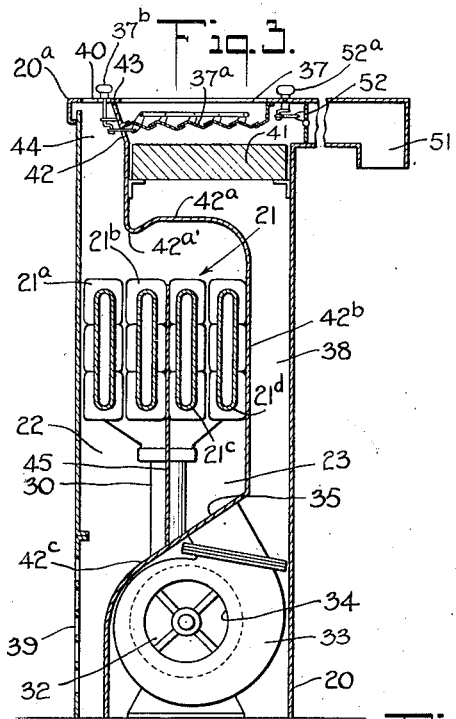
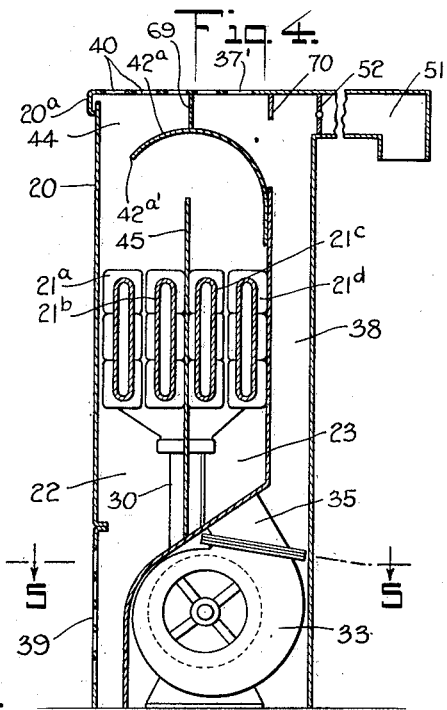
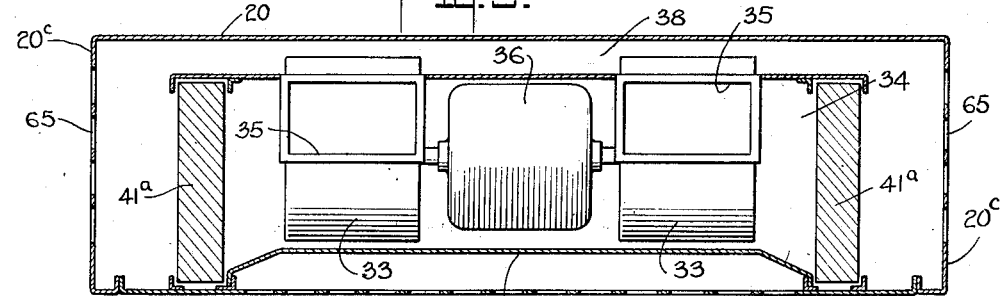
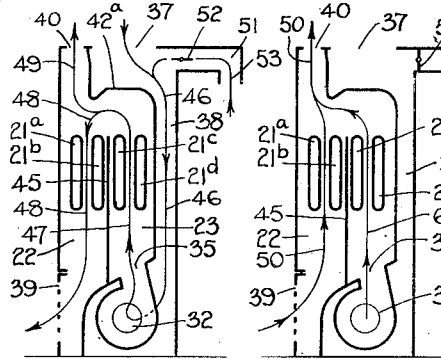
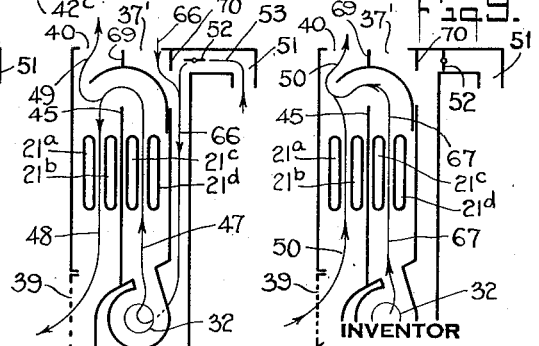
INVENTOR
Clarence M. Woolley
Henry J. Lucke
HIS ATTORNEY Patented Nov. 26, 1935

2,022,333

UNITED STATES PATENT OFFICE 2,022,333

HEATING CABINET

Clarence M. Woolley, New York, N. Y., assignor to American Radiator Company, New York, N. Y., a corporation of New Jersey Application July 7, 1934, Serial No. 734,083

12 Claims. (Cl. 257—137)

My present invention relates to heating cabinets.

In my copending application Ser. #718,904, filed April 4, 1934, entitled Air conditioning heating cabinet, I have set forth and claimed a cabinet provided with heating means, and suitable air projecting means including a fan or equivalent operable under stated conditions for projecting air in heat exchange relation with the heating means, inclusive of recirculating air of the room or other space served by the cabinet, a particular feature of the illustrated cabinet residing in the provision of a radiant face as a part of the heating means, which radiant face is operative during the stage of non-operation of the air projecting means as well as during the stage of operation of the air projecting means.

A particular feature of the present invention resides in the enclosing of the heating means wholly within the cabinet, that is to say, the cabinet is of the non-radiant front type, the primary heating effect of the cabinet being had during the stage of fan operation by projection of the air in heat exchange contact with the heating means and during the stage of non-operation of the air projecting means by gravity, i. e., convection currents engendered by contact of air in its passage through the cabinet in heat exchange contact with the enclosed heating means; suitable provision being made for openings in the cabinet, for the inflow and discharge of the air in the respective stages of operation.

More particularly, the cabinet of my present invention embodies an opening or set of openings adjacent a lowerly portion of the cabinet, preferably at its front, arranged to project heated air during the stage of fan operation. My cabinet embodies further an opening or set of openings in or adjacent its top effective in whole or in part for the discharge of air therethrough during the stage of fan operation, the stated openings serving further for the inflow of air and the discharge of heated air during the stage of non-operation of the projecting means.

The more preferred forms of my invention embody, further, openings at the respective sides of the cabinet for the recirculation therethrough of the air of the room or other space served by the cabinet.

My invention provides, in addition when desired, the supply of fresh air from the exterior atmosphere and/or the supply of conditioned air to the cabinet, the same being mergedly heated with the aforestated air currents.

Further features and objects of the invention will be more fully understood from the following detail description and the accompanying drawings, in which Fig. 1 is a perspective view of a cabinet embodying one type of my invention.

Fig. 2 is a vertical sectional elevation on line 2—2 of Fig. 1.

Fig. 3 is a vertical transverse sectional elevation on line 3—3 of Fig. 2.

Fig. 4 is a transverse vertical sectional elevation, similar to that of Fig. 3, but illustrating another embodiment of my invention.

Fig. 5 is a horizontal sectional view on line 5—5 of Fig. 4, and also of Fig. 3, generally, at a corresponding section.

Fig. 6 is a diagrammatic vertical sectional elevation illustrative of the embodiment of Figs. 1 to 3 during the stage of fan operation.

Fig. 7 is a diagrammatic vertical sectional elevation illustrative of the embodiment of Figs. 1 to 3 during the stage of non-operation of the fan.

Fig. 8 is a diagrammatic vertical sectional elevation illustrative of the embodiment of Figs. 4 and 5 during the stage of fan operation.

Fig. 9 is a diagrammatic vertical sectional elevation illustrative of the embodiment of Figs. 4 and 5 during the stage of non-operation of the fan.

Referring to the embodiment of my invention as illustrated in Figs. 1 to 3, and generally in Fig. 4, the cabinet 20, while shown of general rectangular form, may have any desired exterior configuration, inclusive of such artistic effect as may be preferred.

Within such cabinet 20 I provide suitable heating means 21, comprising, for example, a pair of individual heating elements 21a and 21b, suitably located in the forward channel 22, and further comprising a pair of individual heating elements 21c and 21d suitably located in the rearward channel 23; such arrangement of heating elements is advantageous in affording the assembly of the same as a unit.

The indicated respective heating elements are supplied with a suitable heating medium. As appears in the drawings, the heating medium may be steam and the supply of such heating medium may be had by the employment of an inflow pipe 24, and appurtenant fittings, such as a control valve 25, connected through the elbow 26 with a nipple 27 leading to an inlet header 28; an outlet header 29 is illustrated as connected to a nipple 30 leading to an outflow pipe 31. Supplemental devices and/or attachments, as indicated in the drawings, or pursuant to approved practice, applicable to steam or hot water or equivalent heating system may be employed as preferred. The respective heating elements and associated headers are supported in any suitable manner, known to those skilled in the art. Appropriate supply piping and supporting means for radiator elements and/or group or groups of radiator elements applicable for steam as the heating medium, or equivalent type of heating may be employed, as will be understood by those skilled in the art.

Any other arrangement applicable to the provision of suitable heating means effective for the heating and transit of air through a suitable cabinet, pursuant to my invention, as will appear, may be employed.

Within the cabinet I dispose suitable means for projecting air in effective heat exchange contact with the stated or equivalent heating elements for delivery of the heated air exteriorly of the cabinet.

As illustrated in Fig. 1 through Fig. 4, and diagrammatically shown in Figs. 6 and 7, such air projecting means may comprise one or more fans 32, preferably disposed in suitable fan housings 33, each fan housing having one or more intakes 34, and an outlet 35, see Figs. 3 and 4, each outlet communicating with the stated channel 23. Desirably, a pair of fans 32, 32, see Figs. 2 and 3, driven by a common motor such as the electric motor 36, by direct shaft connection as indicated, or in other suitable geared relation, may be employed.

As appears more fully hereinafter, it is advantageous to locate such fans 32, 32 and the motor 36 at a lower and rearward location within the cabinet.

Desirably, each fan 32 may be of the squirrel cage type, although obviously any other suitable type of fan or equivalent air projecting device may be employed.

In the construction shown in Fig. 1 through Fig. 4, the inflow of air is afforded by an opening 37, see Figs. 1, 2 and 3, preferably in the top plate 20a of the cabinet 20. Such opening 37 may be provided with a grille, as indicated.

The air inflowing through the opening 37 at the stage of air projection is forced under suction by the air projecting means downwardly through the inflow channel 38 in transit to the intake or intakes 34 of the fan or fans 32.

Optimum heat distribution into the room or other space served by the cabinet is had by the provision of an opening or set of openings 39, preferably provided with a grille as indicated, located substantially adjacent to the floor of the room or other space, thus affording comfort to persons by the supply of heated air at and along the floor. Supplemental heated air is supplied by upward discharge from the cabinet, as appears more fully hereinafter, effective during the stage of fan operation, and also during the stage of non-operation of the fan. As illustrated in Figs. 1 and 3, such lowerly disposed opening 39 may be substantially at the bottom of the front face plate 20b of the cabinet 20. Such openings 39 communicates with the stated forward channel 22 of the sub-casing within the cabinet.

The top plate 20a of the cabinet, as appears from Figs. 1, 2 and 3, is provided with an opening 40, which may also have a grille. Desirably a common grille may be employed for the stated openings 37, 40 of the top plate 20a.

If preferred, and as indicated in the drawings, a suitable filter 41 may be suitably located in the inflow channel 38 to filter the air inflowing through the opening 37. Similarly, one or more filters 41a may be located at or within the intake 34 of each fan housing 33. The grille 37 is readily removable to afford access to the filter or filters.

Desirably, the above stated inflow channel 38, and the stated rearward channel 23 and forward channel 22 of the thereby resulting sub-casing are defined by suitable partitions or equivalent, contoured to effect the desired air flow and efficient heating of the air, as by means of a partition 42 which may extend from the margin, see 43, Figs. 1 and 3, between the openings 37 and the openings 40 in the top plate 20a, which partition portion 42 serves as a septum between the downward inflow channel 38 and the upward flow channel 44 to discharge heated air through the opening 40. At its intermediate portion 42a, see Fig. 3, such partition is generally concavely arcuate to serve as a septum between the intake of the downward inflow channel 38 and the rearward upflow channel 23 of the sub-casing; such arcuate portion 42a is of proper concavity and extent of arc to function in deflecting to desired proportion air projected by the stated air projecting means after subjection to the heating elements such as 21c, 21d, to provide a major air flow in subsequent heat exchange contact with the forward heating means such as the heating elements 21a, 21b and thence downwardly through the forward channel 22 to be discharged through the opening 39, the remaining proportion of the stated projected heated air current being diverted by the septum 42a upwardly through the upflow channel 44 and discharged through the opening 40. The rearward partition portion 42b serves as a septum between the major portion of the inflow channel 38 and the rearward upflow channel 23 of the sub-casing. The lower partition portion 42c serves to define the bottom or lowerly portion of the rearward upflow channel 23, and also to define the lowerly portion of the forward channel 22. The thus resulting sub-casing is closed by suitable side septa, as appears from Figs. 2 and 4.

The partition 45 extends from the stated lower partition portion 42c to and desirably between rearward and forward heating elements; as illustrated in Figs. 2 and 3, such partition 45 extends between the forward heating element 21b and the rearward heating element 21c.

Each outlet 35 of the fan casing 33 passes through a suitable opening in the lower partition portion 42c, to thereby sealingly communicate with the rearward channel 23 of the stated sub-casing.

Such septa or partition portion may be of sheet metal or other suitable sheet material. The stated portions of the partitions may be separate and removable, suitably connecting means being employed. Such removable septum is particularly advantageous with respect to the stated septum 42c, to thereby afford access from the front of the cabinet to the motor, its casing, and also to the respective fans and their casings upon removal of the grille of the lower front opening 39 and the stated removable septum 42c.

Such accessibility is also advantageous in permitting access to the filters such as the filters 41a and for removal of dust and other foreign material isolated by the filters and otherwise accumulated within the cabinet.

Fig. 6 indicates diagrammatically the paths of the stated air flow during the stage of air projection through a cabinet of the character shown in Figs. 1, 2 and 3. Specifically, the arrowed line 46 indicates the inflow of air downwardly through the upper opening 37, thence downwardly through the inflow channel 38 and into and through the one or more fans 32; the arrowed line 47 indicates the upward flow of the air through the respective fan housing openings 35 upwardly through the rearward channel 23 of the sub-casing in heat exchange contact with the rearward heating elements 21c, 21d. The arrowed line 48 indicates the air flow deflected under the control of the concave septum 42a downwardly through the forward channel 22 of the sub-casing in heat exchange contact with the forward heating elements 21a, 21b, and thence discharged through the lower grille 39 downwardly toward the floor represented by the base line. The arrowed line 49 indicates the air flow diverted under control by the concave septum 42a through the upper opening 40.

Fig. 7 indicates diagrammatically the paths of air flow during the stage of non-operation of the air projecting means through a cabinet of the character shown in Figs. 1, 2 and 3. Specifically, the arrowed line 50 indicates the air entering the lower grille 39, thence passing through the forward channel 22 of the sub-casing upwardly in heat exchange contact with the forward heating elements 21a, 21b, and thence discharged through the upper opening 40.

Figs. 3, 6 and 7 also show the supplemental supply of fresh or conditioned air through the duct 51 regulated in any suitable manner by a suitable valve 52, similarly as in my aforesaid co-pending application Ser. #718,904. A knob is indicated at 52a, see Fig. 1, for setting the valve 52. The arrowed line 53 in Fig. 6 indicates the air flow of such form of air supply, the same merging with the air flow above referred to and indicated by the arrowed line 46 in its transit through the inflow channel 38.

In the circumstance of the supply of fresh air from the exterior of the building, such duct may advantageously be located to extend through a window opening. Figs. 3 and 4 indicate such duct 51 projecting through the wall of the building below a window sill 54.

Notation is made at this point that the supply of heated air flow upwardly through the upper opening 40 of the cabinet, both during both stage of air projection as indicated by the arrowed line 49 in Fig. 6 and during the stage of non-operation of the air projecting means indicated by the arrowed line 50 in Fig. 7, counteracts at all stages of operation of the cabinet drafts if any may arise by reason of inflow of air from the exterior of the building through the window or otherwise in the room or space served by the cabinet.

Fig. 7 illustrates incidentally the valve 52 of the duct 51 in closed position. In the event that the valve 52 is set in any open position, such air together with any air entrained through the opening 37 of the cabinet is drawn downwardly through the inflow channel 38, correspondingly as indicated by the arrowed line 46 in Fig. 6, thence passing through the fan housing, the fan or fans being idle, for which purpose a squirrel-cage type of fan is advantageous by reason of its non-blocking characteristic when idle.

Humidity is preferably supplied to the heated air currents engendered in the use of my cabinet; such supply of humidity may be had in any suitable manner.

A convenient form of supply of humidity is indicated in the drawings by a receptacle 55 which may be manually or otherwise filled with water and/or other humidifying fluid through its filling opening 56 shown provided with a closure cap 57. In combination with a hot water or equivalent type of heating system, the humidifier is preferably supplementally heated by a suitable electrical resistance unit. The circuit of such electrical heating unit is preferably controlled by a mercoid switch 58 indicated in Fig. 2, or equivalent; the switch 58 is controlled by a float or equivalent responsive to the level of the humidifying fluid, whereby upon undue depletion of the fluid within the receptacle 55, the mercoid switch is thrown to its circuit-opening position to thereby discontinue the heating of the humidifier 55.

A preferred form of combined humidity-temperature- and fluid level control is set forth in my stated co-pending application Ser. #718,904.

The embodiment of my invention shown in Figs. 4 and 5, and illustrated diagrammatically in Figs. 8 and 9, comprises essential parts in common with the embodiment shown in Figs. 1, 2 and 3; these parts are designated by like reference characters.

The embodiment shown in Figs. 4 and 5 comprises in particular the provision of openings 65 preferably having grilles, as indicated in Fig. 5, disposed respectively in the opposite ends 20c of the cabinet 20, and desirably at lower portions thereof, effective for air inflow in re-circulation of the air of the room or other space served by the cabinet during the stage of fan operation.

Simultaneously therewith, re-circulated air entering the upper openings 37, see Fig. 4, is positively enforced by the air projecting means, which air flow, see arrowed line 66, Fig. 8, merges with the stated respective air flows through the end openings 65, thereupon entering into and through the fan housings respectively, and projected thence through the fan-housing-openings 35 and upwardly through the rearward channel 23 of the sub-casing in heat exchange contact with the therein disposed heating elements, see arrowed lines 47 and 48, Fig. 8, and eventually discharged through the respective openings 39, 40, under controlled relative proportions.

In the circumstance of open position of the valve 52 in the duct 51, supplying fresh or reconditioned air, such air flow, indicated in Fig. 8 by the arrowed line 53, merges with the stated air flow 66. The essential air currents ensuing during the stage of fan operation, in this Fig. 4—Fig. 5 type of my cabinet, correspond generally otherwise to those of my Fig. 2—Fig. 3 type, as appears from a comparison of Fig. 8 with Fig. 6.

During the stage of non-operation of the air projecting means, in my Fig. 4—Fig. 5 type, flow of re-circulated air under convection or gravity current differential takes place by inflow into the respective end openings 65, thence through the fan housings and thence upwardly through the rearward channel 23 of the sub-casing as indicated by the arrowed line 67 in Fig. 9, merging with the gravity current air flow indicated by the arrowed line 50, similarly as in Fig. 7 with respect to my Fig. 2—Fig. 3 type.

The septum 69, see Fig. 4, extends between the openings 40 and 37' of the top plate 20a of the cabinet to the deflecting plate 42a, to thus define the upper portion of the downward inflow channel 38 and the upward outflow channel 44.

The partially-extending septum 70, see Fig. 4, serves as a deflection to direct downwardly any air flow 53 supplied through the duct 51, for an open position of its valve 52.

It will be observed that the supply of humidity, as by locating the discharge opening 55a of the humidifier within or adjacent an upward discharge channel, such as the channel 44, condensation of moisture within the cabinet and "clouding" of the discharged air currents are precluded during all stages of operation of my cabinet; also my present invention may be supplemented by devices and/or accessories such as sound absorbing linings or equivalent for the duct 51, upturned edge or eave serving to preclude the entrainment of rain for the duct 51 when employed for supplying air from the outer atmosphere, and the like, similarly as in my aforesaid co-pending application Ser. #718,904.

The opening 37, as indicated at 37a, may be provided with a louvre or other form of shutter, operable by the use of the knob 37b, as is indicated in Fig. 3.

Whereas I have described my invention by reference to specific forms thereof, it will be understood that many changes and modifications may be made without departing from the spirit of the invention.

I claim:

1. The combination of a cabinet provided with a lowerly disposed opening, said cabinet having also an opening in one of its faces, said cabinet being further provided with an opening in its top, heating means disposed in the cabinet, partition means defining forward and rearward passages in heat exchange contact with said heating means, and means for projecting air through the cabinet in heat exchange contact with said heating means and for discharging the thus heated air through said lowerly disposed opening of the cabinet, said opening in the top of the cabinet serving to discharge heated air during the stage of non-operation of the fan, said air projecting means being disposed below said heating means and communicating with said rearward passage.

2. The combination of a cabinet provided with a lowerly disposed opening, said cabinet having also an opening in one of its faces, said cabinet being further provided with an opening in its top, heating means disposed in the cabinet, partition means defining forward and rearward passages in heat exchange contact with said heating means, conduit means within the cabinet embracing said heating means, said conduit means communicating with said opening in the top of the cabinet, and means for projecting air through the conduit means in heat exchange contact with said heating means and for discharging the thus heated air through said lowerly disposed opening of the cabinet, said air projecting means being disposed below said heating means and communicating with said rearward passage.

3. The combination of a cabinet provided with a lowerly disposed opening, said cabinet having also an opening in one side of its faces, heating means disposed in the cabinet, said heating means comprising a plurality of heating elements disposed in spaced relation to one another, conduit means within the cabinet embracing said heating elements in serial relation, and means for projecting air through said conduit means in heat exchange contact with said heating elements serially and for discharging the thus heated air through said lowerly disposed opening of the cabinet.

4. The combination of a cabinet provided with a lowerly disposed opening, said cabinet having also an opening in one of its faces, said cabinet being further provided with an opening in its top, heating means disposed in the cabinet, partition means defining forward and rearward passages in heat exchange contact with said heating means, and means for projecting air through the cabinet in heat exchange contact with said heating means and for discharging the thus heated air through said lowerly disposed opening of the cabinet, said opening in the top of the cabinet serving to discharge heated air during the stage of non-operation of the fan, said air projecting means including fan means disposed rearwardly and lowerly within the cabinet, said air projecting means being disposed below said heating means and communicating with said rearward passage.

5. The combination of a cabinet provided with a lowerly disposed opening, said cabinet having also an opening in one of its faces, said cabinet being further provided with an opening in its top, heating means disposed in the cabinet, partition means defining forward and rearward passages in heat exchange contact with said heating means, conduit means within the cabinet embracing said heating means, said conduit means communicating with said opening in the top of the cabinet, and means for projecting air through the conduit means in heat exchange contact with said heating means and for discharging the thus heated air through said lowerly disposed opening of the cabinet, said air projecting means including fan means disposed rearwardly and lowerly within the cabinet.

6. The combination of a cabinet provided with a lowerly disposed opening, said cabinet having also an opening in one side of its faces, heating means disposed in the cabinet, said heating means comprising a plurality of heating elements disposed in spaced relation to one another, conduit means within the cabinet embracing said heating elements in serial relation, and means for projecting air through said conduit means in heat exchange contact with said heating elements serially and for discharging the thus heated air through said lowerly disposed opening of the cabinet, said air projecting means including fan means disposed rearwardly and lowerly within the cabinet.

7. The combination of a cabinet provided with a lowerly disposed opening, said cabinet having also an opening in one of its faces, said cabinet being further provided with an opening in its top, heating means disposed in the cabinet, partition means defining forward and rearward passages in heat exchange contact with said heating means, means for projecting air through the cabinet in heat exchange contact with said heating means and for discharging the thus heated air through said lowerly disposed opening of the cabinet, said opening in the top of the cabinet serving to discharge heated air during the stage of non-operation of the fan, said air projecting means including fan means disposed rearwardly and lowerly within the cabinet, and means for supplying fresh or conditioned air to said conduit means, said air projecting means being disposed below said heating means and communicating with said rearward passage.

8. The combination of a cabinet provided with a lowerly disposed opening, said cabinet having also an opening in one side of its faces, heating means disposed in the cabinet, said heating means comprising a plurality of heating elements disposed in spaced relation to one another, conduit means within the cabinet embracing said heating elements in serial relation, means for projecting air through said conduit means in heat exchange contact with said heating elements serially and for discharging the thus heated air through said lowerly disposed opening of the cabinet, said air projecting means including fan means disposed rearwardly and lowerly within the cabinet, and means for supplying fresh or conditioned air to said conduit means.

9. The combination of a cabinet provided with upwardly and lowerly disposed openings, said cabinet having also an opening in one of its ends, heating means disposed in said cabinet, partition means defining forward and rearward passages in heat exchange contact with said heating means, and means for effecting inflow of air through said end opening and for projecting air through the cabinet in heat exchange contact with said heating means and for discharging the thus heated air through said first-named upwardly and lowerly disposed openings, said air projecting means being disposed below said heating means and communicating with said rearward passage.

10. The combination of a cabinet provided with upwardly and lowerly disposed openings, said cabinet having also an opening in one of its ends, heating means disposed in serially related channels within said cabinet, and means for effecting inflow of air through said end opening and for projecting air through the cabinet in heat exchange contact with said heating means and for discharging the thus heated air through said first-named upwardly and lowerly disposed openings.

11. The combination of a cabinet having an upwardly disposed opening, heating means disposed in said cabinet, channel means defining forward and rearward passages and embracing said heating means in serial relation, means disposed lowerly in the cabinet for effecting inflow of air through said opening and for projecting air serially through said passages of said channel means in heat exchange contact with said heating means and means for discharging the thus heated air from the cabinet, said discharging means including openings disposed lowerly and upwardly in the cabinet, said lowerly and upwardly disposed openings serving during the stage of non-operation of said air projecting means respectively for the inflow and outflow of air currents through the cabinet through said channel means.

12. The combination of a cabinet having an upwardly disposed opening, heating means disposed in said cabinet, a plurality of channel means embracing said heating means in serial relation, means disposed lowerly in the cabinet for effecting inflow of air through said opening and for projecting air through said channel means in heat exchange contact with said heating means and means for discharging the thus heated air from the cabinet, said discharging means including openings disposed lowerly and upwardly in the cabinet, said lowerly and upwardly disposed openings serving during the stage of non-operation of said air projecting means respectively for the inflow and outflow of air currents through the cabinet through one of said channel means.

CLARENCE M. WOOLLEY. [L. S.]